(12) United States Patent
Wang et al.

(10) Patent No.: US 8,301,864 B2
(45) Date of Patent: Oct. 30, 2012

(54) APPARATUS AND METHOD FOR EXECUTING RAPID MEMORY MANAGEMENT UNIT EMULATION AND FULL-SYSTEM SIMULATOR

(75) Inventors: Hua Yong Wang, Beijing (CN); Kun Wang, Beijing (CN); Honesty Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 1262 days.

(21) Appl. No.: 12/030,163

(22) Filed: Feb. 12, 2008

(65) Prior Publication Data

US 2008/0222384 A1   Sep. 11, 2008

(30) Foreign Application Priority Data

Feb. 12, 2007   (CN) .......................... 2007 1 0005260

(51) Int. Cl.
  *G06F 12/00* (2006.01)

(52) U.S. Cl. ...................................... 711/205

(58) Field of Classification Search ........................ None
  See application file for complete search history.

(56) References Cited

FOREIGN PATENT DOCUMENTS

CN         1896972       1/2007

OTHER PUBLICATIONS

Witchel et al., "Embra: Fast and Flexible Machine Simulation" Sigmetrics '96, pp. 1-12, 1996.

*Primary Examiner* — Brian Peugh
(74) *Attorney, Agent, or Firm* — Ido Tuchman; William J. Stock

(57) ABSTRACT

A method for performing rapid memory management unit emulation of a computer program in a computer system, wherein address injection space of predefined size is allocated in the computer system and a virtual page number and a corresponding physical page number are stored in said address injection space, said method comprising steps of: comparing the virtual page number of the virtual address of a load/store instruction in a code segment in said computer program with the virtual address page number stored in said address injection space; if the two virtual page numbers are the same, then obtaining the corresponding physical address according to the physical page number stored in said address injection space; otherwise, performing address translation lookaside buffer search, that is, TLB search to obtain the corresponding physical address; and reading/writing data from/to said obtained corresponding physical address. The present invention also provides an apparatus and computer program product for implementing the method described above.

20 Claims, 8 Drawing Sheets

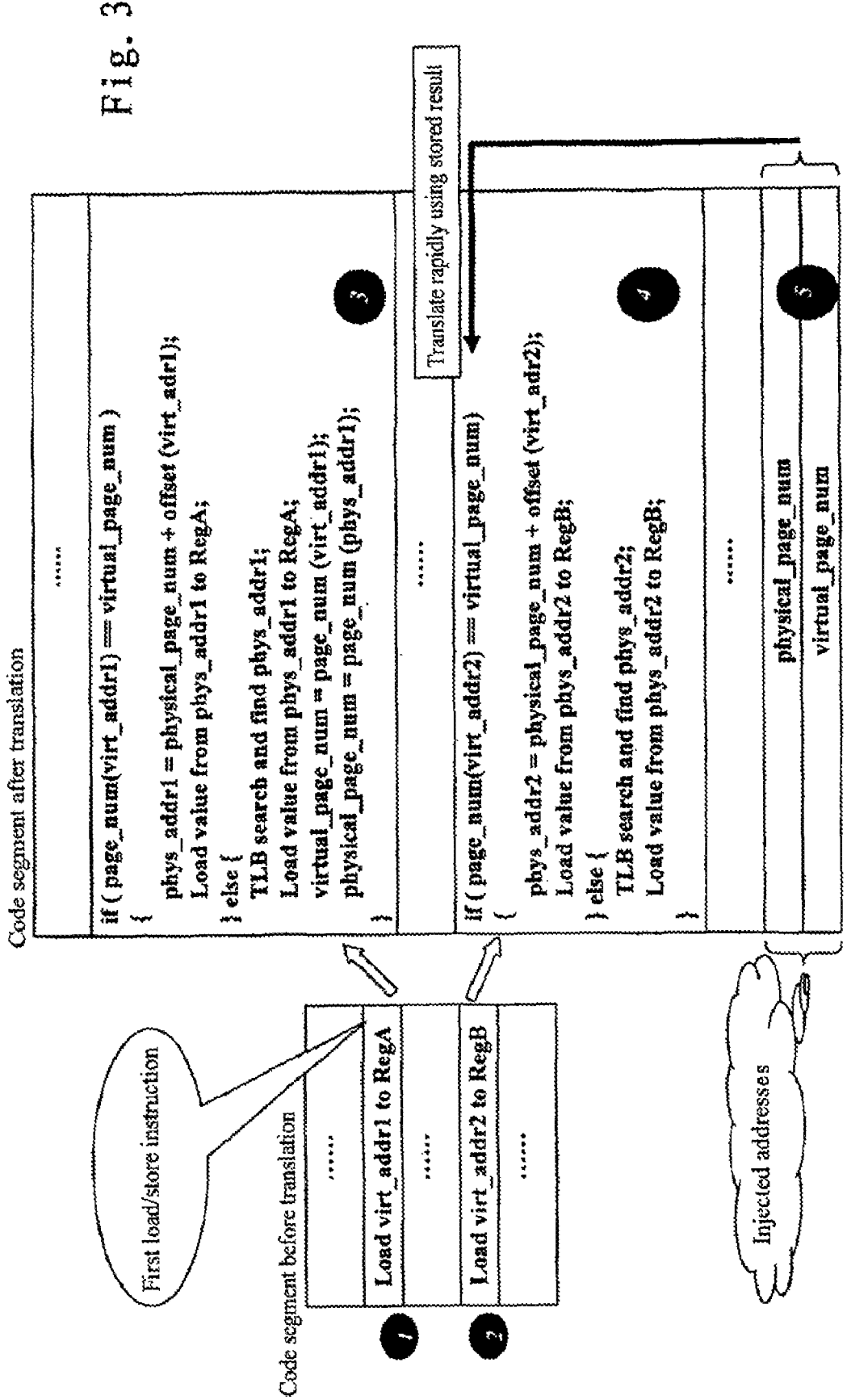

```
if ( page_num(virt_addr1) == virtual_page_num )
{
   phys_addr1 = physical_page_num + offset (virt_adr1);
   Load/Store value from/to phys_addr1;
} else {
   TLB search and find phys_addr1;
   Load/Store value from/to phys_addr1;
   virtual_page_num = page_num (virt_addr1);
   physical_page_num = page_num (phys_addr1);
}
```

Fig. 4

```
if ( page_num(virt_addr2) == virtual_page_num )
{
   phys_addr2 = physical_page_num + offset (virt_adr2);
   Load/Store value from/to phys_addr2;
} else {
   TLB search and find phys_addr2;
   Load/Store value from/to phys_addr2;
}
```

Fig. 5 ated into a function call inside which the complex function is implemented. That is, one load/store instruction of the

APPARATUS AND METHOD FOR EXECUTING RAPID MEMORY MANAGEMENT UNIT EMULATION AND FULL-SYSTEM SIMULATOR

CROSS-REFERENCE TO RELATED APPLICATIONS

This application claims priority under 35 U.S.C. §119 to Chinese Patent Application No. 200710005260.8 filed Feb. 12, 2007, the entire text of which is specifically incorporated by reference herein.

BACKGROUND OF THE INVENTION

The present invention generally relates to techniques for simulating computer architectures, and particularly relates to a full-system simulator utilizing the dynamic binary translation (DBT) technique.

Almost all computer architectures can be evaluated and studied by a simulator. A simulator allows designers to rapidly evaluate the performance of various architectures, thus reduces the cost and saves the time of project development.

For example, the simulator technique and the classification thereof have been roughly described in Joshua J. Yi and David J. Liljia, "Simulation of Computer Architectures: Simulators, Benchmarks, Methodologies, and Recommendations", IEEE Transactions on Computers, pp. 268-280, Vol. 55, No. 3, March 2006.

A full-system simulator is a program that provides virtualized execution environment for applications and an operating system (OS). For example, a full-system simulator can enable PowerPC Linux and related Linux applications to run on an x86 Windows platform. The dynamic binary translation (DBT) technique is one of the techniques for speeding up a full-system simulator. Although the full-system simulator does not necessarily use the DBT technique, using the DBT technique can significantly improve the speed of the simulator. Typical examples of full-system simulators implemented by utilizing the DBT technique include: a simulator disclosed in Richard Uhlig, Roman Fishtein, Oren Gershon, Israel Hirsh, and Hong Wang, "SoftSDV: A Presilicon Software Development Environment for the IA-64 Architecture", Intel Technology Journal Q4, 1999; and QEMU (see http://fabrice.bellard.free.fr/qemu/). In addition, typical full-system simulators further include: Simics system (see http://virtutech.com/), Skyeye system (see http://www.skyeye.org/index.shtml), and Wukong system (see http://embedded.zju.edu.cn/wukong/).

Most modern computers contain a memory management unit (MMU) that translates virtual addresses used by software into physical addresses for accessing memories and I/O devices. MMU emulation is an important part of the full-system emulation. Known solutions to implement the MMU emulation have introduced large performance overhead.

For example, a full-system simulator utilizing the MMU emulation has disclosed in Emmett Witchel, Mendel Rosenblum, "Embra: fast and flexible machine simulation", Proceedings of the 1996 ACM SIGMETRICS International Conference on Measurement and Modeling of Computer Systems, Philadelphia, Pa., USA, pp. 68-79, which reports roughly every third instruction is a "load" or "store". This implies Embra's slowdown is at least a factor of 3 or 4.

FIG. 1 illustrates the logic structure of conventional MMU emulation. As shown in FIG. 1, the left part of FIG. 1 shows an exemplary code segment before translation, the middle part shows a code segment obtained by translating the exemplary code segment, and the right part shows contents stored in a Translation Lookaside Buffer (TLB), which will be referred to as a TLB table hereinafter.

It should be noted that, in the simulator, the TLB table is an array which can be accessed directly, and the TLB table described herein is a TLB table emulated inside the simulator, and is not a TLB table of actual hardware.

The MMU performs the task of address translation with the help of the TLB. Each TLB entry contains the address of an virtual memory page of 4 k size and the corresponding physical memory address of the page, as well as some bits for the purpose of permission and protection (For the sake of simplicity, these bits are not shown in FIG. 1).

Each load/store instruction in the code segment requires address translation, which is a very complex process. In general, when performing code binary translation, one load/store instruction of a target machine needs to be translated into multiple instructions of a host machine so as to accomplish its corresponding function. Generally, a load/store instruction is transltarget machine is translated into one function on the host machine. The function corresponding to the load/store instruction is predetermined, and this corresponding function is varied depending on simulators from various companies. However, this function is fixed in the same one simulator. Therefore, the procedure of translation is very simple and only needs translating each load instruction of the target machine into one corresponding function call of the host machine, and translating each store instruction of the target machine into one corresponding function call of the host machine.

In current methods of MMU emulation, each load/store instruction is translated into one function call that executes TLB search. Each time when an address translation is needed, the simulated TLB is searched (as shown in FIG. 1). If a virtual address is in the TLB, then a corresponding physical address is obtained. If the virtual address is not in the TLB, the MMU may generate a TLB-miss exception or automatically fill the TLB by reading page tables in emulated memory. A result of the TLB search contains a virtual page number and a physical page number, wherein in general the virtual page number and the physical page number are both addresses of 32 bits with the lower 12 bits of zero. This is because, in a typical 32-bit computer system, an address of 32 bits can be divided into two parts, wherein the higher 20 bits thereof are a page number while the lower 12 bits are a page offset (a similar process can be executed for a 64-bit computer system). The page offset in the virtual address space is the same as that in the physical address space.

Since load/store instructions need to be frequently executed, the speed of the MMU has a direct impact on the whole system's performance. However, since the TLB search is a very time-consuming process, the speed of the MMU emulation is not fast enough.

In real hardware, the TLB is essentially a cache; therefore, algorithms regarding the TLB lookup or search are essentially algorithms for cache lookup or search, so, see John L. Hennessy, David A. Patterson, "Computer Architecture: A Quantitative Approach", ISBN 7-5053-9916-0. In brief, the TLB can be regarded as containing many lines each including a virtual address and a physical address.

Generally, there are two basic methods for the TLB search:

(1) If a certain virtual address is known, then comparison is executed in the TLB one line by one line. If a certain line with the same virtual address is found, then a corresponding physical address in this line is returned. If it is implemented in the actual hardware, then the speed of the search will be very fast, because the hardware can search multiple lines in parallel, for example, may search 100 lines or more at a time. Therefore, the time required for searching multiple lines is the same as that of searching one line, no matter how many lines are searched. Such a TLB can be referred to as a fully-associated TLB.

(2) Suppose that one virtual address can only be placed in a certain fixed line. For example, it can be prescribed that, if the remainder of a virtual address divided by 10 is 1, then the virtual address is placed on the $1^{st}$ line; if the remainder is 2, then the virtual address is placed in the $2^{nd}$ line, and so on. In this way, only 10 lines are required in the TLB. However, there may be the case where many virtual addresses are placed in the same line, thereby resulting conflict. Therefore, a common way is to place the most recently used virtual address therein. In this way, the search process is performed conveniently. For a given virtual address, if its corresponding line number is found at first, then it is determined whether the virtual address in this line is the same as the given virtual address. If so, it means that the virtual address has been found in the TLB, thus a physical address contained in this line is returned. Such a TLB can be referred to as a set-associated TLB.

As viewed from the simulator, the purpose of the simulator is to emulate the real hardware, therefore, the simulator needs to emulate the procedure of the TLB search as described above. As for the fully-associated TLB, parallel search cannot be performed by software (because parallel search implemented by software has a significant overhead and is inefficient), so the search process can only be conducted one line by one line, which is often implemented by a loop body program. Therefore, for a TLB containing 64 lines, comparison is required to be performed sixty-four times, thus the speed of the TLB search is very slow. As for the set-associated TLB, the line number can be calculated directly, and then is used to conduct the search, however, the speed of the search is still not fast enough. In practice, if the process of calculation and comparison is included, QEMU needs at least 20 assembler instructions to accomplish the function described above.

For example, when the ISA (Instruction Set Architecture) of the target machine is Power PC and host ISA is x86, in a well designed full-system simulator QEMU, one load/store instruction is translated into about 20 assembler instructions.

In existing simulators, the speed of the MMU emulation is still not satisfying, thus, what is needed is to provide a novel method of performing the MMU emulation, which can reduce the number of instructions obtained after translating load/store instructions so that the speed of the MMU emulation and full system emulation is improved.

The present invention is proposed in order to overcome the defects existed in the prior art, improve the speed of the MMU emulation and thereby improve the performance of the whole system.

BRIEF SUMMARY OF THE INVENTION

It can be found from the practice that, adjacent load/store instructions are often likely to access multiple addresses within the same one memory page because of certain data locality of computer programs. For example, as shown in FIG. 1, virt_addr1 and virt_addr2 are likely to be the same address or in the same page. If so, it is not necessary to search the TLB again.

A configuration of the present invention is a full-system simulator utilizing the DBT technique. For the sake of simplification, full-system emulation utilizing the DBT technique is referred to as "full-system emulation" for short.

One aspect of the present invention is a method which can perform rapid MMU emulation. In this method, only the address of the first load/store instruction in a code segment is required to be translated, so the first TLB search is executed and the search result is stored. Then, as for load/store instructions other than the first one within the same code segment, the stored search result is used to execute rapid address translation so that the MMU emulation can be executed rapidly.

According to an exemplary embodiment of the present invention, the result of the first TLB search in a code segment is required to be stored in a memory. In one embodiment of the present invention, the search result is stored at the end of each code segment (of course, the search result can be stored at other positions in the code segment, or can be stored separated from the code segment). This is equivalent to adding some contents or information into the code segment, and such a way is referred to as address injection in the present invention.

Another configuration of the present invention is an apparatus and full-system simulator which can perform rapid MMU emulation. To this end, according to one aspect of the present invention, there is provided a method for performing rapid memory management unit emulation of a computer program in a computer system, wherein address injection space of predefined size is allocated in the computer system and a virtual page number and its corresponding physical page number are stored in said address injection space, said method comprising steps of: obtaining the virtual address of a load/store instruction in a code segment in said computer program; calculating the virtual page number and page offset of the virtual address; comparing the calculated virtual page number with the virtual address page number stored in said address injection space; if the two virtual page number are the same, then obtaining the corresponding physical address according to the physical page number stored in said address injection space; if the two virtual page numbers are not the same, then performing the address translation lookaside buffer search, that is, TLB search to obtain the corresponding physical address; and reading/writing data from/to said obtained corresponding physical address.

According to another aspect of the present invention, there is provided an apparatus for performing rapid memory management unit emulation of a computer program in a computer system, comprising: a code translator for translating program code of a target machine into program code of a host machine and allocating address injection space of predefined size; an execution unit for executing the translated program code of the host machine; a translated code buffer for storing the program code of the host machine translated by said code translator; and a translation buffer management unit for managing the translated code buffer and the address injection space, wherein said address injection space is used to store a virtual page number and a corresponding physical page number, when the translation of the program code is executed by the code translator, the virtual page number of a load/store instruction in a code segment in said program code of the target machine is compared with the virtual page number stored in said address injection space, if the two virtual page numbers are the same, then the corresponding physical address is obtained according to the physical page number stored in said address injection space, otherwise, address translation lookaside buffer search, that is, TLB search is executed by the execution unit to obtain the corresponding physical address.

An embodiment of the present invention further provides a full-system simulator comprising the apparatus described above.

An embodiment of the present invention also provides a corresponding computer readable storage medium and computer product for implementing the method described above.

It is assumed that a computer program has multiple code segments with good data locality. It should be noted herein that, a computer program or code segment with "good locality" means that only smaller primary memory space is required and requirements for large primary memory space in a shorter period of time would not appear when said computer program or code segment is running.

In most cases, in a code segment with good data locality, TLB search is required to be executed for the first load/store instruction thereof, and the search result is stored. The search result comprises the numbers of a virtual page and a physical page, that is, a virtual page number and a physical page number. As for other load/store instructions within the same code segment, the stored search result is used to execute rapid address translation.

One advantage of an embodiment of the present invention lies in that, utilizing the address injection technique, the address translation can be executed rapidly so that the speed of the MMU emulation in the full-system simulator can be markedly improved.

Another advantage of an embodiment of the present invention lies in that, since an address injection space of predefined size is allocated at the end of each code segment, the address injection space can be maintained and managed very conveniently so that contents stored therein can be read rapidly.

These and other advantages of embodiments of the present invention will be more apparent from the detail description of preferred embodiments of the present invention given in connection with the accompanying drawings.

BRIEF DESCRIPTION OF THE SEVERAL VIEWS OF THE DRAWINGS

The present invention will be better understood by referring to the following description taken with reference to the accompanying drawings, in which the same or similar reference signs are used to denote the same or similar elements throughout the drawings. The drawings together with the following detailed description are incorporated into the specification and formed as a part thereof, and are used to further illustrate preferred embodiments of the present invention and explain principles and advantages of the present invention, in which:

FIG. 3 illustrates exemplary code segments before and after translating a certain code segment by utilizing the method 200 as shown in FIG. 2 according to one embodiment of the present invention;

FIG. 4 illustrates a code sequence obtained by translating the first load/store instruction in said code segment according to this embodiment (which corresponds to the code sequence ③ in FIG. 3 and also corresponds to step 270 in FIG. 2);

FIG. 5 illustrates a code sequence obtained by translating load/store instructions other than the first one in said code segment according to this embodiment (which corresponds to the code sequence ④ in FIG. 3 and also corresponds to step S260 in FIG. 2);

DETAILED DESCRIPTION OF THE INVENTION

Exemplary embodiments of the present invention will be described with reference to the accompanying drawings hereinafter. For the sake of clarity and conciseness, not all the features of actual implementations are described in the specification. However, it will be appreciated that, during developing any of such actual implementations, numerous implementation-specific decisions must be made to achieve the developer's specific goals, for example, compliance with system-related and business-related constraints which will vary from one implementation to another. Moreover, it is also to be appreciated that, such a development effort might be complex and time-consuming, but may nevertheless be a routine task for those skilled in the art having the benefit of this disclosure.

Furthermore, it is noted herein that, in order to avoid obscuring the present invention due to unnecessary details, the drawings only show device structures and/or processing steps closely related to the solutions according to the present invention and other details little related to the present invention are omitted.

Figure 1:
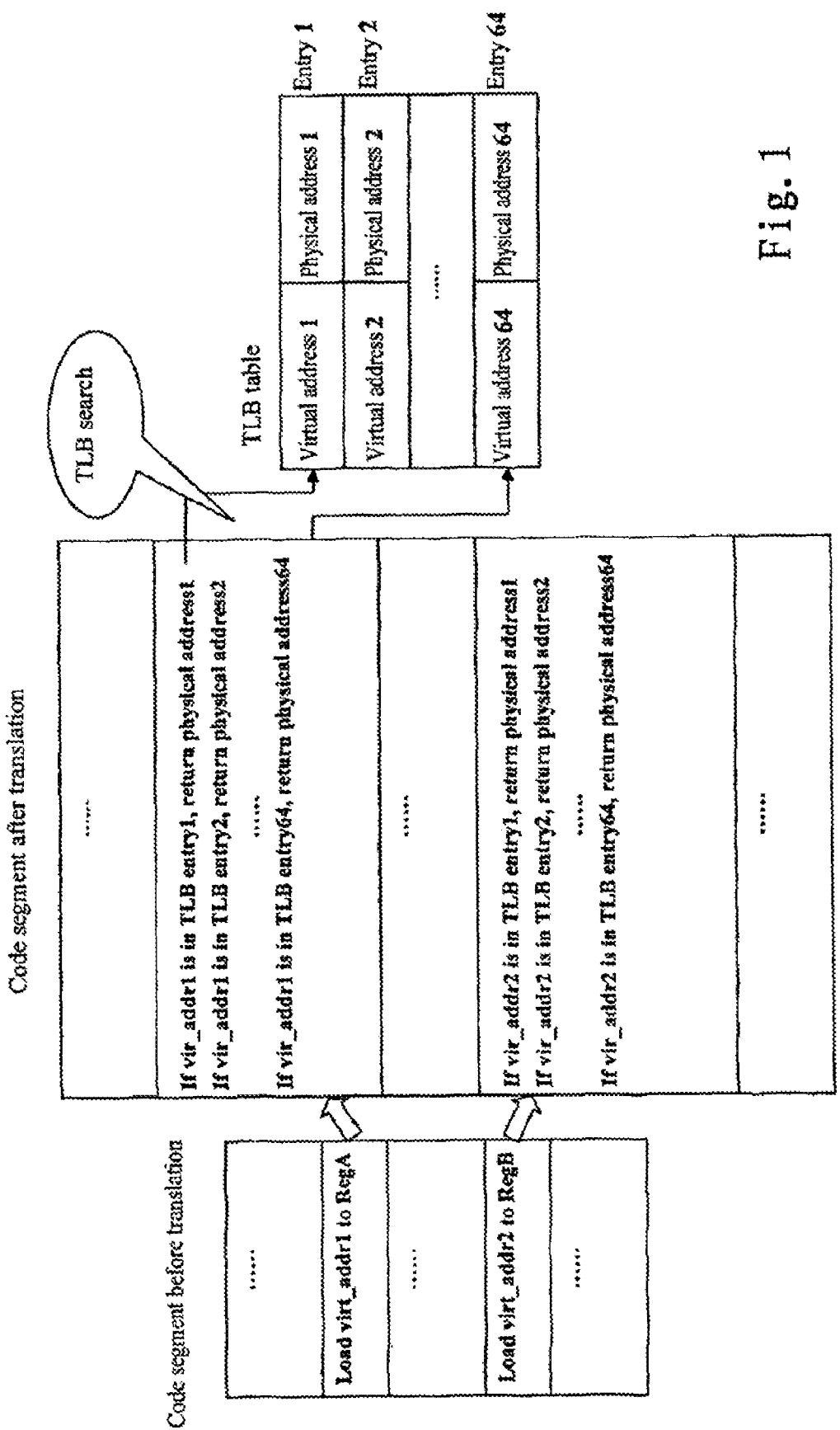
FIG. 1 illustrates the logic structure of traditional MMU emulation.
Figure 2:
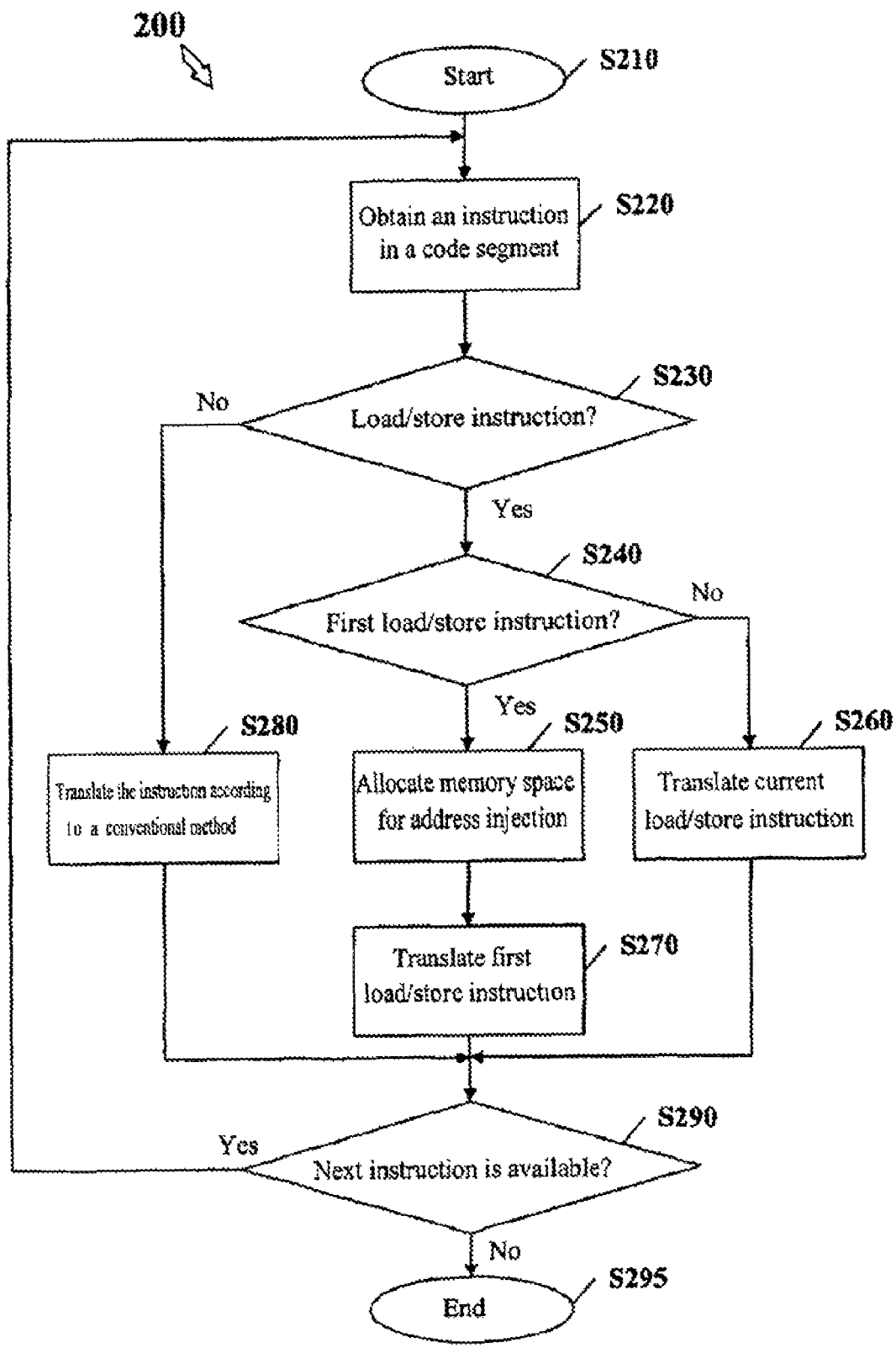
FIG. 2 illustrates a process flow chat of a method 200 for performing dynamic binary translation of a code segment in a computer program according to one embodiment of the present invention.

FIG. 2 illustrates a process flow chat of a method 200 for performing dynamic binary translation of a code segment in a computer program according to one embodiment of the present invention.

Just as described above, the solutions of the present invention are based on the fact that a computer program has multiple code segments with good data locality.

There are several methods used to determine the boundary of code segments. For example, a fixed number of neighboring basic blocks can be deemed as one segment. Or static analysis on address parameters of adjacent load/store instructions can be used as a hint to determine data locality. For example, according to a basic address register, if all the load/store instructions contained in a code segment are based on the same basic address, then the locality thereof is likely to be good, that is, this code segment can be considered as a code segment with good data locality as described in the present invention. Of course, there are also many other methods which can be used to determine individual code segments with good data locality in the computer program. The present invention is not focused on how to determine the boundary of code segments, and there is no any limitation on which method can be used to determine the boundary of code segments in the solutions of the present invention, therefore, any known method in the prior art can be used to determine the boundary of code segments, details of which are omitted herein.

As shown in FIG. 2, the method 200 begins with step S210. Then, at step S220, an instruction in a code segment is obtained.

At step S230, it is determined whether said instruction is a load/store instruction or not, and if so, then the process of the method 200 proceeds to step S240.

At step S240, it is determined whether said load/store instruction is the first load/store instruction in the code segment or not, and if so, then the process proceeds to step S250; otherwise, the process turns to step S260.

At step S250, memory space for address injection is allocated. Just as described above, a search result of the first TLB search in a code segment is required to be stored, therefore, certain memory space is required to be allocated in a memory to store the search result of the first TLB search.

In this embodiment, for facilitating the management of the memory space, memory space of predefined size, for example, memory space of a 8-byte length is allocated at the end of each code segment, in which one virtual page number (represented by a variable virtual_page_num) and one physical page number (represented by a variable physical_page_num) are stored.

Next, the processing flow proceeds to step S270, where said first load/store instruction is translated in a specific way (for example, the way as shown in FIG. 4).

If it is determined at step S240 that said load/store instruction is not the first load/store instruction in said code segment, then the process proceeds to step S260, where said load/store instruction is translated in another specific way (for example, the way as shown in FIG. 5).

The detailed process of translating the first load/store instruction and other load/store instructions than the first one in a certain code segment will be described in detail by referring to FIGS. 3-5 hereinafter.

If it is determined at step S230 that said instruction is not a load/store instruction, then the process of the method turns to step S280, where the instruction is translated according to a conventional method. Since this translation method is the same as that of the prior art and is not the focus of attention of the solutions of the present invention, the detailed description thereof is omitted in this disclosure.

After translating said instruction, the process of the method 200 proceeds to step S290, where it is determined whether a next instruction in said code segment is available or not. If so, then the process returns to step S220, and repeats the processing operations of steps S220 to S290 described above until the last instruction in said code segment is reached.

If the last instruction in the code segment has been reached (that is, the determination result of step S290 is negative), then the method 200 ends at step S295.

FIG. 3 illustrates exemplary code segments before and after translating a certain code segment by utilizing the method 200 as shown in FIG. 2 according to one embodiment of the present invention. A code segment before the translation is shown at the left side of FIG. 3, while a corresponding code segment obtained after the translation using the method shown in FIG. 2 is shown at the right side of FIG. 3.

As shown in FIG. 3, using the method 200 as shown in FIG. 2, the first load/store instruction ① is translated into a code sequence ③, and a load/store instruction ② after the first one is translated into a code sequence ④. Because of good data locality of the code segment, the first branch in the code sequences ③ and ④ will occur with higher probability. In FIG. 3, page_num( ) and offset( ) are two functions used in the code sequences ③ and ④ to calculate upper 20 bits (that is, page number) and lower 12 bits (that is, page offset) of a virtual address, respectively.

In addition, in the right bottom part of FIG. 3, there is also illustrated an address injection space ⑤ with a virtual page number, i.e., a variable virtual_page_num and a physical page number, i.e., a variable physical_page_num stored therein according one embodiment of the present invention. The virtual_page_num and physical_page_num are two variables (or parameters) used to record the TLB search result, that is, they are used to record the virtual page number (which can be obtained by dividing the virtual address by the page size) and physical page number (which can be obtained by dividing the physical address by the page size) lastly accessed by instruction ①, respectively. In this embodiment of the present invention, these two variables or parameters are stored at the end of the translated code segment (as shown in ⑤ of FIG. 3).

FIG. 4 illustrates a code sequence obtained by translating the first load/store instruction in said code segment according to this embodiment (which corresponds to the code sequence ③ in FIG. 3), and FIG. 5 illustrates a code sequence obtained by translating the load/store instruction other than the first one in said code segment according to this embodiment (which corresponds to the code sequence ④ in FIG. 3).

As shown in FIG. 4, it is assumed that the virtual address of the first load/store instruction is virt_addr1. Functions page_num( ) and offset( ) are used to calculate the corresponding virtual page number (upper 20 bits) and page offset (lower 12 bits) of the virtual address, respectively. The first load/store instruction is translated into a branch structure consisted of host instructions, that is, an if-else structure as shown in FIG. 4.

In the translated code sequence, it is checked at first whether the virtual address virt_addr1 exists in the address injection space or not. This check is implemented by comparing the virtual page number of the virtual address virt_addr1 with the variable virtual_page_num. As described above, the variable virtual_page_num is stored in the address injection space and is initialized as an invalid value during the translation of the code segment. If virt_addr1 exists in the address injection space, then the translated code sequence can calculate a corresponding physical address directly. Otherwise, the translated code needs to search the TLB and store the search result (including the virtual page number and physical page number) into the address injection space, that is, store the search result into the variables virtual_page_num and physical_page_num, respectively. The TLB search action in the second branch (that is, else { }) structure is the same as the traditional TLB search method, and is not described in detail herein.

An execution procedure of the code sequence as shown in FIG. 4 is described in detail with reference to FIG. 6 blow.

Figure 6:
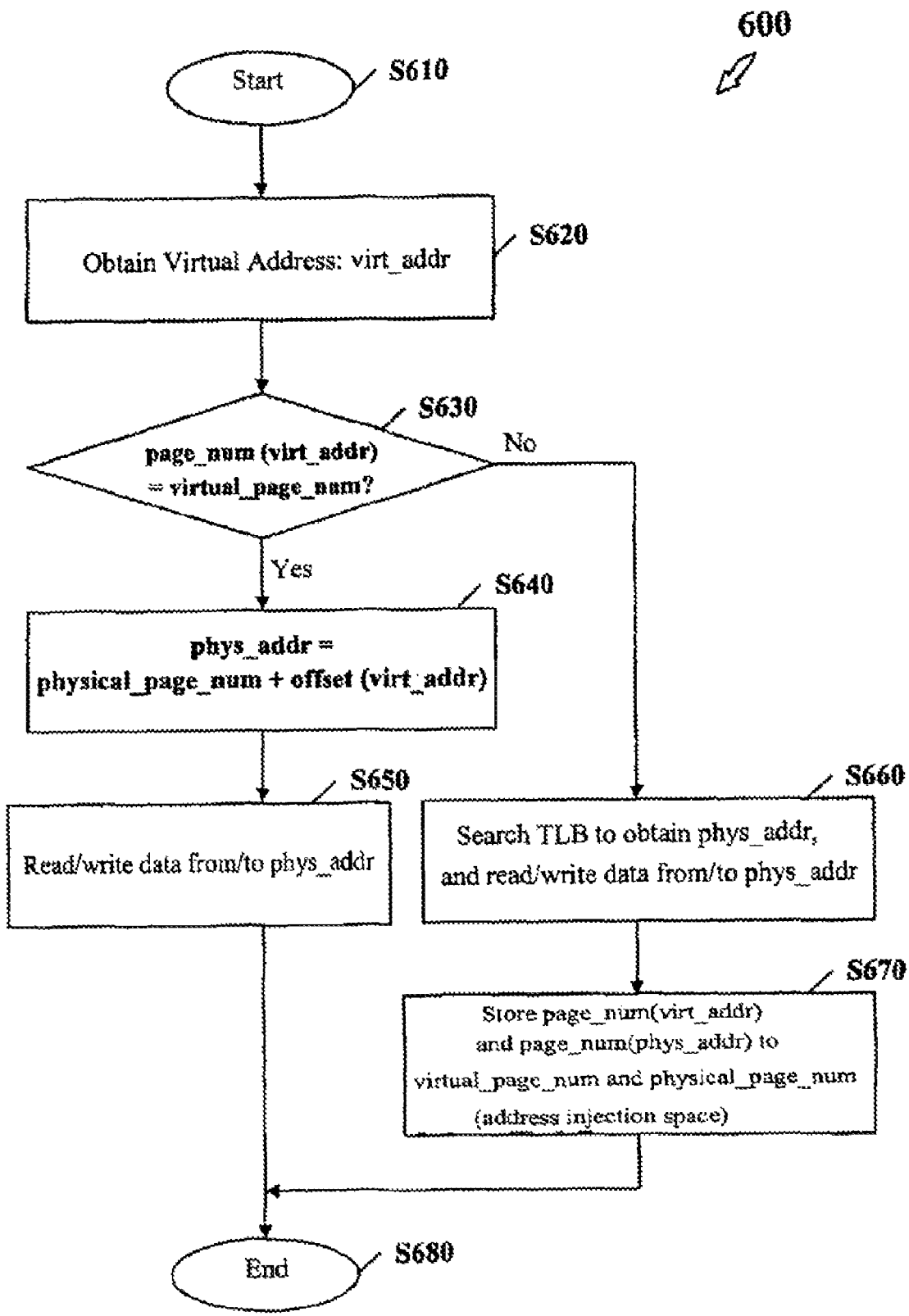
FIG. 6 illustrates a flow chart of an execution procedure 600 of the first load/store instruction after being translated into a host program.

FIG. 6 illustrates an execution process 600 of the code sequence shown in FIG. 4 (corresponding to an execution procedure of the result generated by step S270 in the flow chart shown in FIG. 2).

As shown in FIG. 6, the process 600 begins with step S610.

At step S620, the virtual address virt_addr (which is virt_addr1 in this embodiment) of the first load/store instruction in the code segment is obtained.

Then, at step S630, it is checked whether the virtual address virt_addr exists in the address injection space or not, that is, determine whether the virtual page number of virt_addr (which can be obtained by page_num(virt_addr)) is equal to the variable virtual_page_num or not.

It should be noted herein that, if the code segment is executed for the first time, then the first load/store instruction in the code segment necessarily needs to execute TLB search; whereas, if the code segment has been executed multiple times, then the TLB search may not be necessary for the first load/store instruction, because the result of the TLB search may have been stored into the address injection space.

If the determination result of step S630 is Yes, which indicates that the virtual address virt_addr has already stored in the address injection space, then the process 600 proceeds to step S640, where the following equation and the variable physical_page_num stored in the address injection space are used to directly calculate a corresponding physical address (represented by phys_addr):

$$phys\_addr=physical\_page\_num+offset(virt\_addr).$$

As mentioned above, in this embodiment of the present invention, the allocated address injection space is of 8-byte length. That is, the variables virtual_page_num and physical_page_num stored therein is of 4-byte length, i.e., 32-bit length, respectively, with lower 12 bits thereof being zero. Since the page offset in the virtual address apace is the same as in physical address space, the corresponding physical address can be obtained by adding the physical page number physical_page_num and the page offset offset(virt_addr) directly.

Then, the process 600 proceeds to step S650, where data is read/written from/to the calculated physical address phys_addr.

The processes of the above steps S640 and S650 correspond to corresponding code in the first branch structure, i.e., if { } structure in the code segment as shown in FIG. 4.

If the determination result of step S630 is No, then the process 600 proceeds to step S660, where the TLB is searched (that is, the TLB is searched one line by one line, which is the same as the search process in the prior art and is not described in detail herein) to obtain the corresponding physical address phys_addr, then data is read/written from/to the physical address.

Next, the process 600 proceeds to step S670, where the result of the TLB search, that is, the virtual page number page_num(virt_addr) and the physical page number page_num(phys_addr), are stored into the variables virtual_page_num and physical_page_num (that is, the address injection space), respectively.

The processes of the above steps S660 and S670 correspond to corresponding code in the second branch structure, i.e., else { } structure in the code segment as shown in FIG. 4. The process 600 ends at step S680.

It should be noted herein that, the allocated address injection space may not be of 8-byte length. For example, as described above, in the computer system, the higher 20 bits of an address of 32-bit length is the page number, therefore, in another embodiment of the present invention, the two variables virtual_page_num and physical_page_num stored in the address injection space may be defined as 20 bits long. Thus, the size of the address injection space only requires 40 bits, i.e., 5 bytes long, which may be helpful to save the memory space. In this instance, when calculating a physical address, the physical_page_num needs to be shifted left by 12 bits so as to change the address of 20-bit length into an address of 32-bit length, then the shifted address is added with the page offset (an address of 12-bit length) to calculate the corresponding physical address. That is, in this instance, the calculation equation used in the above step S640 has been changed into the following equation:

$$phys\_addr=(physical\_page\_num<<12)+offset(virt\_addr).$$

As for a load/store instruction other than the first one in the code segment, as shown in FIG. 5, it is assumed that the virtual address thereof is virt_addr2, and this instruction can also be translated into a branch structure, i.e., if-else structure, consisted of host instructions.

The translated code sequence also needs to check at first whether virt_addr2 exists in the address injection space or not. This check is still implemented by comparing the page number of virt_addr2 with the stored variable virtual_page_num. The variable virtual_page_num is initialized as an invalid value during the translation and can be modified when executing the translated code sequence of the first load/store instruction. If the virt_addr2 exists in the address injection space, then the translated code sequence can calculate the corresponding physical address directly. Otherwise, the TLB search is required. The TLB search action in the second branch is the same as the traditional TLB search method, and thus is not described in detail herein. This translating process of the load/store instruction other than the first one differs from that of the first load/store instruction in that the result of the TLB search is not required to be saved in this translation process.

Figure 7:
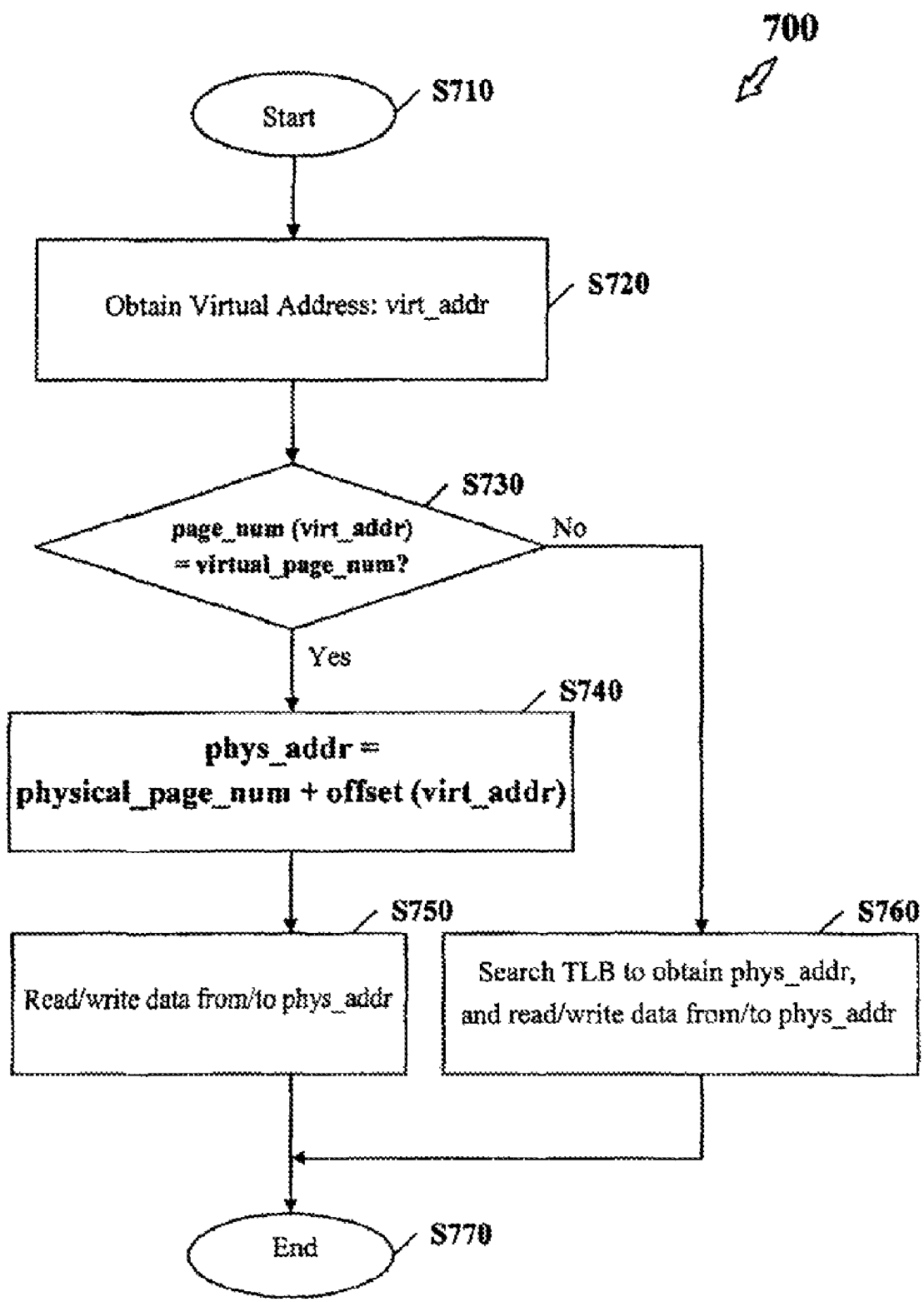
FIG. 7 illustrates a flow chart of an execution procedure 700 of load/store instructions other than the first one after being translated into a host program.

FIG. 7 illustrates a flow chat of an execution procedure 700 of the code sequence as shown in FIG. 5 (corresponding to an execution procedure of the result generated by step S260 in the flow chart as shown in FIG. 2).

It can be seen from the flow charts as shown in FIGS. 6 and 7 that, the flow of the process 600 is similar to that of the process 700, and the difference between them only lies in that the result of the TLB search is not required to be stored in the process 700, that is, the process of step S670 is omitted.

Therefore, for the sake of the simplicity of the specification, the process 700 shown in FIG. 7 is not described in detail anymore.

The method 200 according to the present invention has been described in accordance with one embodiment of the present invention in connection with FIG. 2 to FIG. 7. However, it should be understood that, the processes as shown in FIGS. 2, 6 and 7 are just illustrative, and in fact, depending on design requirements, the execution order of individual steps thereof can be modified or adjusted, and the processes of some steps thereof can be combined, merged or executed in parallel.

For example, in the flow chart of the method 200 as shown in FIG. 2, the step S250 of allocating the address injection space can also be executed in advance, for example, it can be executed preceding step S220.

It is apparent that various modification and adjustment can be made to the method 200 shown in FIG. 2 by program designers as necessary, therefore, it is not necessary to enumerate all possible implementations in this specification.

Figure 8:
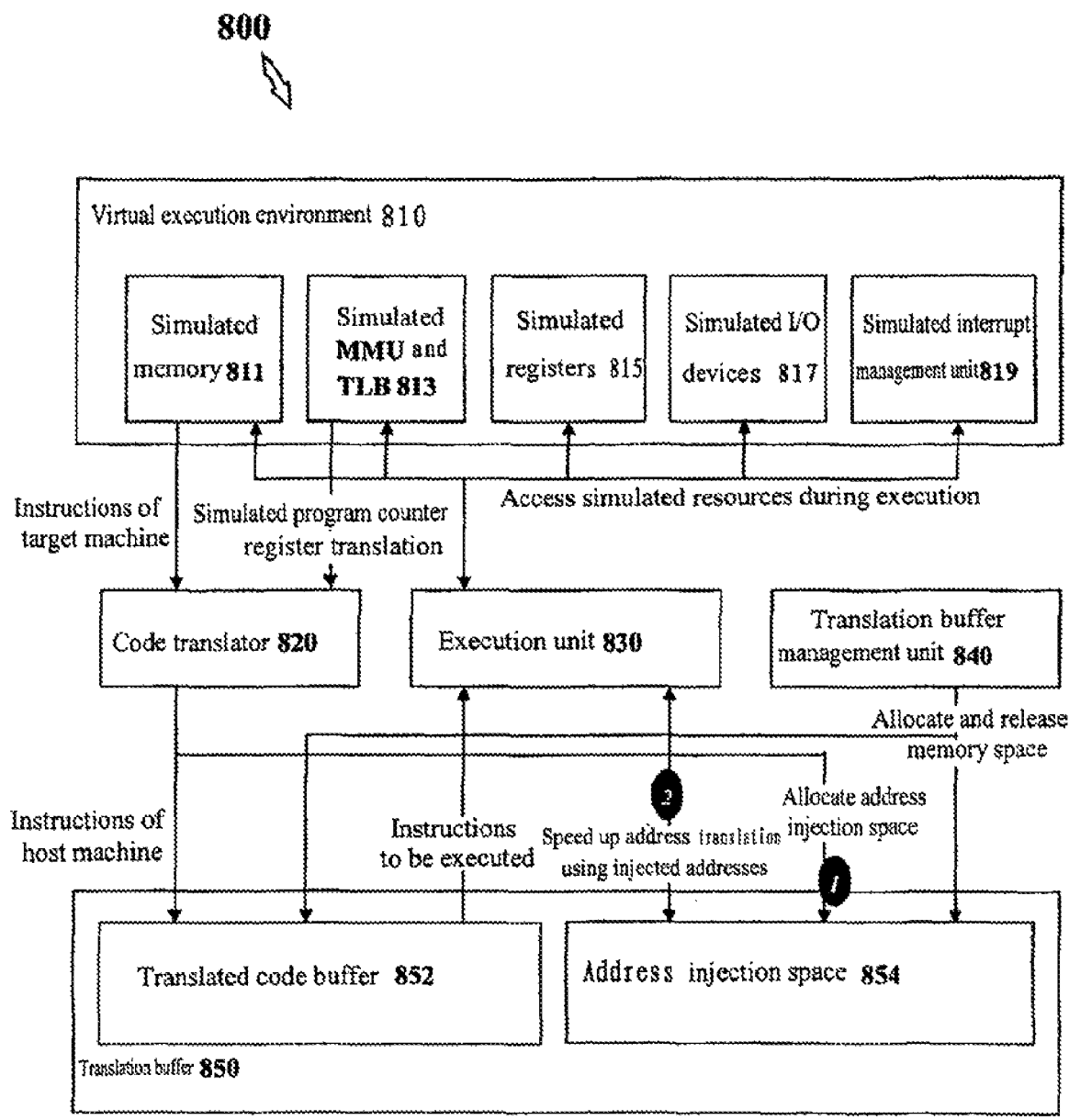
FIG. 8 illustrates a structural block diagram of a full-system simulator 800 with the function of dynamic binary translation according to an embodiment of the present invention.

FIG. 8 illustrates a structural block diagram of a full-system simulator 800 with the function of dynamic binary translation according to one embodiment of the present invention.

As shown in FIG. 8, virtual execution environment 810 provides all the units necessary for running target programs on the host machine. These units includes a simulated memory 811, a simulated MMU and TLB 813, simulated registers 815, simulated I/O devices 817, and a simulated interrupt management unit 819, etc.

The simulated memory 811 is a chunk of virtual memory allocated on the host platform. The operating system and application software of the virtual execution environment (target machine system) are stored in this simulated memory. As viewed from the virtual execution environment, the simulated memory is just like a real physical memory within a machine.

The simulated MMU and TLB 813 simulates the function of address translation and protection. The simulated registers 815 can simulate registers in the target machine system. For example, if the target machine system is x86, the simulated registers can include EAX, EBX and so on. If the target machine system is PPC, the simulated registers can include r0, r1, and so on. These target registers are simulated by integers of 32-bit or 64-bit length on the host platform. The simulated I/O devices 817 are something like a serial port, physical interface card and so on.

Since in general cases the operating system of the target machine requires the functions of these devices, a full-system simulator must simulate them. Of course, it is also possible to incorporate other devices depending on design requirements, all of which has not been shown for the sake of simplicity.

The simulated interrupt management unit 819 is used to simulate the function of interrupt management. For example, the following functions can be implemented: 1) when an interrupt occurs, forcing a program counter in the computer system to record changes in the address of an interrupt handler; 2) masking/disabling some interrupt signals; 3) providing an index number of the I/O device that generates an interrupt signal; and so on. Of course, other functions can be provided depending on design requirements, all of which has not been list out for the sake of simplicity.

In addition, the full-system simulator 800 further comprises a code translator 820, an execution unit 830, a translation buffer management unit 840 and a translation buffer 850, etc.

The code translator 820 of the present invention is different from that of the existing conventional full-system simulator. In addition to the normal function of translating code of the target machine into code of the host machine like the conventional code translator, the code translator 820 can also, as shown in FIG. 2, translate the first load/store instruction in each code segment with good data locality into executing the TLB search and storing the search result (including the virtual page number and physical page number) in the address injection space 854 (which will be describe later) (which is true in most cases), and translate load/store instructions other than the first one within the same code segment into using the stored search result to execute rapid address translation.

In addition, the code translator 820 further has a special function of allocating suitable address injection space (as shown in ① of FIG. 8), which makes the present invention distinguishing from other conventional binary translation systems. The overall process of the code translator 820 has been described with reference to FIG. 2, wherein the process of translating code of the target machine into code of the host machine is the same as that of the prior art and those operations related to allocating address injection space have been describe above in connection with FIGS. 2 and 3, therefore, it is not described in detail anymore in order to avoid duplication.

As described above, the TLB search result of the first load/store instruction in each code segment, that is, two variables (or parameters) virtual_page_num and physical_page_num are stored in each address injection space to speed up the address translation process of load/store instructions other than the first one within the code segment. Therefore, the address of the allocated address injection space must be recorded by the translated code sequence. That is to say, the code translator must know the exact physical address of the allocated address injection space, and this exact physical address must be encoded into the translated binary code of the host machine, just as this address is an immediate number of assembler code. There exist a number of methods for encoding this physical address into the translated program code in the prior art, and the specific implementations may be different on different platforms, therefore, the detailed description thereof will be omitted herein.

In addition, the applicant has noticed that the method 200 described above in connection with FIG. 2 generates code of relatively large size which contain one or more branch structures (as shown in FIGS. 4 and 5) after executing the binary translation. However, actually executed code is relatively smaller because lots of code exists in the branches that will rarely be executed in fact. Therefore, in another embodiment of the present invention, the code translator can re-organize the translated code in a compact way. For example, in FIGS. 4 and 5, there are multiple pieces of code that are similar or totally the same. Thus, these pieces of code can be further collected and combined into a sub-function, which can also be implemented by many methods of the prior art. In this way, those places that originally require a large piece of code can be replaced with a single function call. Therefore, the size of the generated code will be significantly reduced. The smaller code size increases the code locality, which usually means that the code will be run faster. Furthermore, this reduces the overload of the translated code buffer since it is not needed to prepare a memory of larger size.

As shown in FIG. 8, the translation buffer 850 is shown to comprise a translated code buffer 852 and address injection space 854. The translated code buffer 852 is used to store code generated after performing the binary translation of program code. The translated code is in the form of an instruction set of the host machine and can be executed by the execution unit 830 directly on the host platform. The address injection space 854 is used to store all the TLB search results of the first load/store instructions in individual code segments. The values in the address injection space are accessed by the execution unit 830 when the memory address is needed to be translated. If the desired address exists in the address injection space, then the address translation operation will be very fast and the TLB search is not necessary anymore.

Although the translated code buffer 852 and the address injection space 854 is shown as two separate parts in FIG. 8, the address injection space 854 can be allocated within the translated code, or can be allocated in any location easy to access.

As described above, in one embodiment of the present invention, only two parameters, i.e., the virtual page number virtual_page_num and the physical page number physical_page_num, are recorded in each address injection space, therefore, only allocating 8 bytes for each address injection space is enough for a 32-bit system. In addition, as mentioned above, it is also possible to allocate less than 8 bytes for each address injection space if the memory space is limited on the host machine. In this case, as for a 32-bit system, since the lower 12 bits of virtual_page_num and physical_page_num are always zero, they can be neglected and only the higher 20 bits of the addresses are required to be recorded. That is, it is sufficient to allocate only 5 bytes for each address injection space. Of course, it is possible to allocate more memory space to record more parameters.

Figure 9:
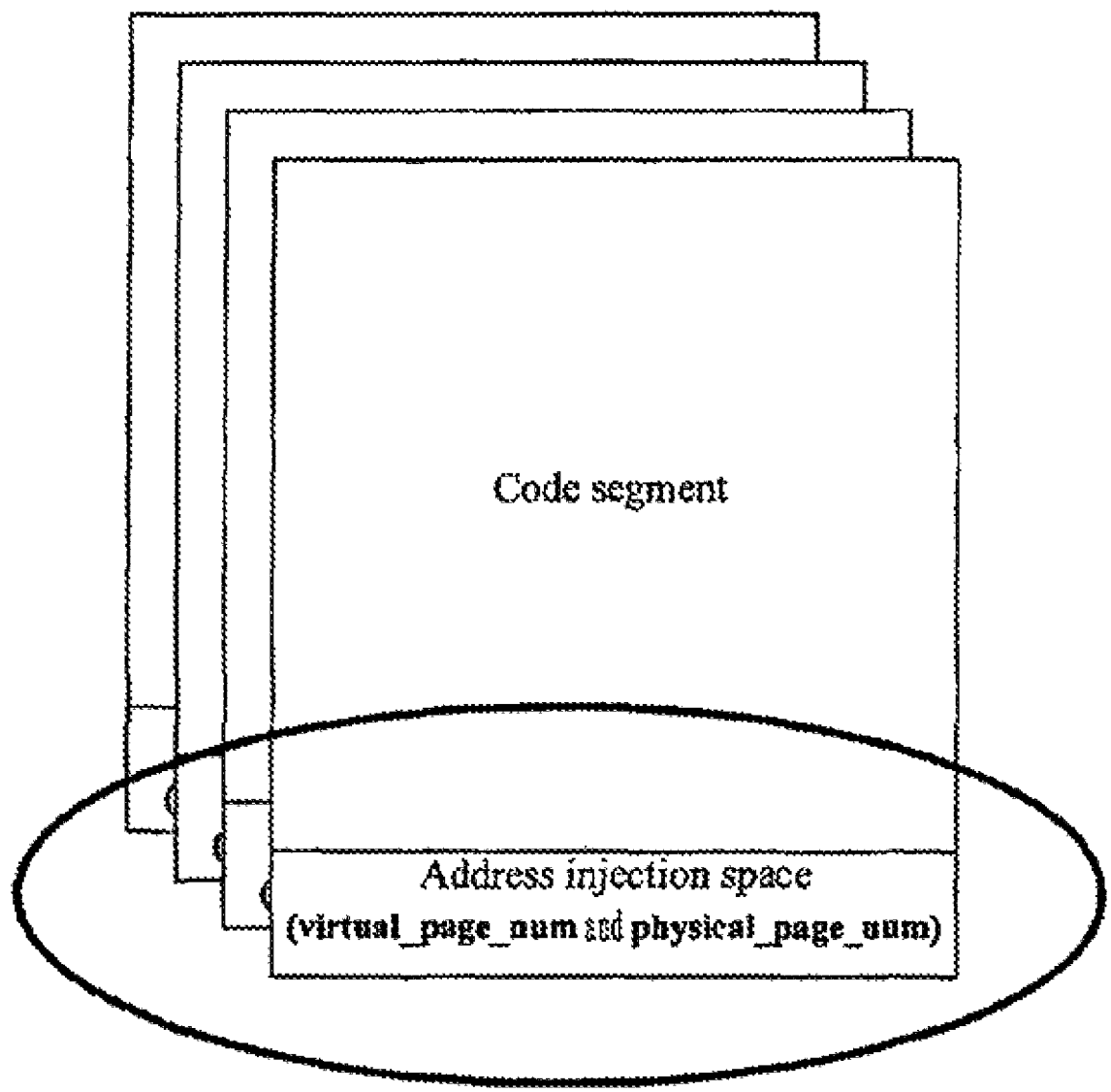
FIG. 9 illustrates a schematic diagram of code segments obtained after allocating address injection space at the end of each translated code segment according to an embodiment of the present invention.

In the full-system simulator 800 as shown in FIG. 8, the address injection space is dispersed. As described above, for each code segment that contains memory access instructions, 8-byte space is allocated at the end the code segment. This is done mainly in view of scalability. If continuous space is prepared beforehand, it is difficult to predict the size of this continuous space. Furthermore, during release, lots of scattered free fragments will exist and it is a great overhead to record them. If the address injection space is appended to the end of the code segment (as shown in FIG. 9), it is easy to maintain the space. When the code segment is released, the space associated with this segment is also released at the same time. This method utilizes the nature that the code segment and the address injection space thereof have the same life cycle.

The allocated address injection space should satisfy alignment requirement. Although most machines do not enforce such a limitation on the memory address, aligned addresses can always get improved performance. Therefore, in another preferred embodiment of the present invention, it is always required that the start address of the address injection space is a multiple of 4. If the host machine is x86, then it is required to pad some bytes (for example, zero) succeeding the code segment for alignment.

Of course, besides these implementations described above, other methods can also be considered (although the advantages thereof are not necessarily apparent). For example, when simulating a SMP (Symmetric Multiple Processor) system, the address injection space can be centralized for one processor, but dispersed for different processors.

As shown in FIG. 8, the execution unit 830 fetches instructions of the host machine from the translated code buffer 852. Since the code is for the host platform, it can be executed directly. If the desired code is not in the translated code buffer, it needs to notify the code translator 829 to translate the desired code as soon as possible and wait for the translation result.

In the full-system simulator 800 shown in FIG. 8, during the address translation, the address injection space can be accessed rapidly. Only when the address injection space cannot do the translation, it resorts to the simulated MMU and TLB 813. The action for the execution unit 830 to the access address injection space is marked as ② in FIG. 8, which corresponds to FIGS. 6 and 7. As described before, in most cases, the address injection space can do the translation successfully because of data locality. The overall speed has been significantly increased.

In addition, an issue that has to be considered and handled is correctly processing interruption during accessing the address injection space. For example, when the first load/store instruction in a code segment wants to save the address translation result into the address injection space, an interrupt from the simulated I/O devices 817 stops the execution instruction stream and enforces the execution unit 830 to execute an interrupt handler. It is assumed that the interrupt occurs precisely between two instances of saving the parameter virtual_page_num and saving the parameter physical_page_num. This means that only the parameter virtual_page_num has been saved, but the parameter physical_page_num has not been saved yet. In this case, the values stored in the address injection space may be inconsistent, which should be treated as a potential error. In the full-system simulator 800 according to the present invention, any interruption during accessing the address inject space can be simply prohibited from being executed by the execution unit 830 so as to avoid the occurrence of this potential error. Of course, other methods can also be employed. For example, if the physical page number physical_page_num cannot be saved, then the virtual page number virtual_page_num stored in the address injection space is cleared (for example, it may be set as an invalid value or be emptied), and the actions of saving the two parameters virtual_page_num and physical_page_num are re-executed after the interruption.

During execution, the translated code accesses the simulated I/O devices 817, the simulated registers 815 and the simulated memory 811 just like in other simulator systems, which is the same as that of the prior art.

As shown in FIG. 8, the translation buffer management unit 840 is in charge of the management of the translated code buffer 852 and the address injection space 854. Only the hottest code can be stored in the translated code buffer 852. This means that the translated code buffer 852 should be periodically checked by the translation buffer management unit 840 to see if the code segment is recently used. The code segment that has not been used for a long time, which can be set according to practical requirements, is removed from the translated code buffer 852. In this way, the size of the translated code buffer 852 can be maintained at an acceptable level. In the virtual execution environment, many programs only run once. Therefore, it is not necessary to store their translated code in the translated code buffer 852 after their termination. However, some programs will run again and again. It is very valuable to store the translated code thereof in the translated code buffer 852 after such programs run multiple times have terminated. The translation buffer management unit 840 is responsible for judging whether a code segment should be removed from the translated code buffer or not. Many existent algorithms, such as a LRU (least recently used) or random-selection algorithm, are suitable to implement these functions.

In addition, considering that multi-process programs can be supported by the virtual execution environment in practice applications, the translation buffer management unit 840 of the full-system simulator 800 as shown in FIG. 8 can be improved. In another embodiment of the present invention, besides the normal function of managing the translated code buffer 852, the translation buffer management unit also has another very important and unique function.

The virtual execution environment supports multi-process programs, which means that process context switch is a frequently happened event. When two processes share a code segment but have different TLB tables, since the address injection space allocated at the end of the code segment can only store one TLB search result, the addresses stored in the address injection space may lead to an error when the stored result is utilized to execute the rapid address translation. The solution to this issue may be as follows. Each time when the context switch happens, the TLB or a certain simulated register will be flushed and assigned to a new value. For example, on an x86 platform, CR3 register is changed whenever process switch happens. The translation buffer management unit monitors this register or TLB to be aware of the occurrence of the process context switch. Each time when the context switch happens, the values stored in the corresponding address injection space are cleared so as to void the occurrence of error and guarantee the correctness. After the clearance of the address injection space, if the code segment is executed again, then the TLB is searched and the search result is saved again just as if it runs for the first time.

Although the method and full-system simulator according to the embodiments of the present invention have been described in connection with FIGS. 1-9, it is apparent to those skilled in this art that various modifications can be made to the method and full-system simulator described above depending on design requirements.

In the full-system simulator according to the present invention, as for the first load/store instruction in a code segment with good data locality, the TLB search is executed and the search result thereof is stored in the address injection space, which is true in most cases. The search result includes the virtual page number and physical page number. As for load/store instructions other than the first one within the same code segment, the stored search result is utilized to execute the rapid address translation. However, it is also possible to store multiple TLB search results in the address injection space and to make the length of the address injection space variable. Such cases are extensions to the method of the present invention, and thus fall into the scope of the present invention.

In summary, in the present invention, base on the fact that a computer program comprises multiple code segments with good data locality, a new technique called "address injection" which can significantly improve the speed of the MMU emulation has been proposed.

The practices have proved that, utilizing the address injection technique proposed in the present invention, the number of instructions after the address translation can be reduced to 10 or less from originally 20, which means that the speed of the MMU emulation can be improved by at least 50%.

Furthermore, it is obvious that the operation procedure of the method according to the present invention described above can also be implemented in the form of a computer executable program stored in various machine readable storage media.

Moreover, the objects of the present invention can also be implemented by providing a storage medium with code of the above executable program stored thereon directly or indirectly to a system or device, and then reading out and executing the program code by a computer or center processing unit (CPU) of the system or device.

At this time, as long as the system or device has a function of executing a program, implementing modes of the present invention are not limited to the program, and the program can be in any form of, for example, an object program, program executed by an interpreter, or script program provided to an operating system, etc.

The machine readable storage media mentioned above may include but not be limited to various memories and storage units, semiconductor devices, magnetic disk units such as optical, magnetic and magneto-optic disks, and other media suitable for storing information, etc.

In addition, the present invention may be achieved by a client computer by connecting to corresponding websites on the Internet, downloading the computer program code according to the present invention and installing the same into the computer and then executing the program code.

Finally, it is also noted that, in this document, relational terms such as left and right, first and second, and the like are used merely to distinguish one entity or action from another entity or action without necessarily requiring or implying any actual such relationship or order between such entities or actions. Moreover, the terms "comprise", "comprising," "include" or any other variations thereof, are intended to cover a non-exclusive inclusion so that a process, method, article, or device that comprises a list of elements does not only include these elements but also may include other elements not explicitly listed or inherent to such process, method, article, or device. An element preceded by "a" or "an" does not, without more constraints, preclude the existence of additional identical elements in the process, method, article, or device that comprises the element.

Although the embodiments of the present invention have been described in detail with reference to the accompanying drawings, it should be noted that, these embodiments are only used to illustrate the present invention but not to limit the present invention. Various modifications and changes can be made by those skilled in the art without departing from the spirit and scope of the present invention. Therefore, the scope of the present invention is only defined by the appended claims and the equivalents thereof.

That which is claimed is:

1. A method for performing rapid memory management unit emulation of a computer program in a computer system, wherein address injection space of predefined size is allocated in the computer system and a virtual page number and its corresponding physical page number are stored in said address injection space, said method comprising:
    obtaining the virtual address of a load/store instruction in a code segment in said computer program;
    calculating the virtual page number and page offset of the virtual address;
    comparing the calculated virtual page number with the virtual address page number stored in said address injection space;
    if the two virtual page numbers are the same, obtaining the corresponding physical address according to the physical page number stored in said address injection space;
    if the two virtual page numbers are not the same, performing address translation lookaside buffer (TLB) search to obtain the corresponding physical address; and
    reading/writing data from/to the obtained corresponding physical address.

2. The method according to claim 1, before reading/writing data from/to the obtained corresponding physical address, further comprising:
    determining whether said load/store instruction is the first load/store instruction within said code segment or not,
    wherein if said load/store instruction is the first load/store instruction within said code segment, and said calculated virtual page number is not the same as said stored virtual page number, then after said step of performing the TLB search to obtain the corresponding physical address, said method further comprises a step of:
    storing said calculated virtual page number and the physical page number of said obtained corresponding physical address into said address injection space.

3. The method according to claim 1, wherein obtaining the corresponding physical address according to the physical page number stored in said address injection space further comprising:
    calculating the physical address of said load/store instruction as said corresponding physical address according the physical page number stored in said address injection space and said calculated page offset.

4. The method according to claim 1, wherein performing the TLB search to obtain the corresponding physical address further comprising:
    searching the TLB for a line containing the calculated virtual address one line by one line, so that the physical address contained in the line is returned as said corresponding physical address.

5. The method according to claim 1, wherein said address injection space is allocated at the end of said code segment, and the virtual page number and physical page number stored in said address injection space are initialized as invalid values when the address translation of said code segment is performed for the first time.

6. The method according to claim 1, wherein any interruption is prohibited from being executed during accessing the address injection space.

7. The method according to claim 1, wherein in the case where a multi-process program is supported by the computer system, the corresponding address injection space is cleared each time when conducting process context switch.

8. The method according to claim 1, wherein said computer program contains one or more code segments each of which has good data locality, and said method is applicable to each of the code segments.

9. The method according to claim 8, wherein multiple address injection spaces are allocated, each address injection space is of 8-byte length, and the virtual page number and physical page number stored therein are of 32-bit length, respectively.

10. The method according to claim 8, wherein multiple address injection spaces are allocated, each address injection space is of 5-byte length, and the virtual page number and physical page number stored therein are of 20-bit length, respectively.

11. An apparatus for performing rapid memory management unit emulation of a computer program in a computer system, comprising:
a code translator for translating program code of a target machine into program code of a host machine and allocating address injection space of predefined size;
an execution unit for executing the translated program code of the host machine;
a translated code buffer for storing the program code of the host machine translated by said code translator; and
a translation buffer management unit for managing the translated code buffer and the address injection space,
wherein said address injection space is used to store a virtual page number and a corresponding physical page number,
when the translation of the program code is executed by the code translator, the virtual page number of a load/store instruction in a code segment in said program code of the target machine is compared with the virtual page number stored in said address injection space, if the two virtual page numbers are the same, then the corresponding physical address is obtained according to the physical page number stored in said address injection space, otherwise, address translation lookaside buffer (TLB) search is executed by the execution unit to obtain the corresponding physical address.

12. The apparatus according to claim 11, wherein said computer program contains one or more code segments, each of which has good data locality.

13. The apparatus according to claim 12, wherein there are multiple address injection spaces, each of which is allocated at the end of each code segment.

14. The apparatus according to claim 13, wherein each address injection space is of 8-byte length, and the virtual page number and physical page number stored therein are of 32-bit length, respectively.

15. The apparatus according to claim 13, wherein each address injection space is of 5-byte length, and the virtual page number and physical page number stored therein are of 20-bit length, respectively.

16. The apparatus according to claim 11, wherein any interruption is prohibited from being executed during accessing the address injection space.

17. The apparatus according to claim 11, wherein the translated code buffer is checked periodically by the translation buffer management unit so as to remove the program code that has not been used for a long time.

18. The apparatus according to claim 11, wherein in the case where a multi-process program is supported by the computer system, the corresponding address injection space in the translated code buffer is cleared by the translation buffer management unit each time when conducting process context switch.

19. The apparatus according to claim 11, wherein the virtual page number and physical page number stored in said address injection space are initialized as invalid values when the translation of the corresponding code segment is performed for the first time.

20. A computer program product embodied in computer readable medium comprising computer executable code for performing rapid memory management unit emulation of a computer program in a computer system, wherein address injection space of predefined size is allocated in the computer system and a virtual page number and its corresponding physical page number are stored in said address injection space, said computer program product configured to:
obtain the virtual address of a load/store instruction in a code segment in said computer program;
calculate the virtual page number and page offset of the virtual address;
compare the calculated virtual page number with the virtual address page number stored in said address injection space;
if the two virtual page numbers are the same, obtain the corresponding physical address according to the physical page number stored in said address injection space;
if the two virtual page numbers are not the same, perform address translation lookaside buffer (TLB) search to obtain the corresponding physical address; and
read/write data from/to the obtained corresponding physical address.

* * * * *